United States Patent
Flickinger

(10) Patent No.: US 9,894,398 B2
(45) Date of Patent: Feb. 13, 2018

(54) METHOD AND SYSTEM FOR ADDRESSABLE AND PROGRAM INDEPENDENT ADVERTISING DURING RECORDED PROGRAMS

(71) Applicant: Prime Research Alliance E., Inc., Tortola (VG)

(72) Inventor: Gregory C. Flickinger, Furlong, PA (US)

(73) Assignee: Prime Research Alliance E., Inc. (VG)

( * ) Notice: Subject to any disclaimer, the term of this patent is extended or adjusted under 35 U.S.C. 154(b) by 0 days.

(21) Appl. No.: 14/671,272

(22) Filed: Mar. 27, 2015

(65) Prior Publication Data
US 2015/0201229 A1 Jul. 16, 2015

Related U.S. Application Data

(63) Continuation of application No. 12/270,298, filed on Nov. 13, 2008, now abandoned, which is a (Continued)

(51) Int. Cl.
*H04N 21/435* (2011.01)
*H04N 21/2668* (2011.01)
(Continued)

(52) U.S. Cl.
CPC .......... *H04N 21/2668* (2013.01); *H04N 5/76* (2013.01); *H04N 5/782* (2013.01);
(Continued)

(58) Field of Classification Search
CPC .......... H04N 21/4325; H04N 21/4334; H04N 21/4358; H04N 21/440281; H04N 21/44029; H04N 21/44213
(Continued)

(56) References Cited

U.S. PATENT DOCUMENTS 4,862,268 A 8/1989 Campbell et al.
4,930,011 A 5/1990 Kiewit
(Continued)

FOREIGN PATENT DOCUMENTS

WO 9911065 3/1999
WO 9966719 12/1999
WO 0001149 1/2000

*Primary Examiner* — Dominic D Saltarelli
(74) *Attorney, Agent, or Firm* — The Belles Group, P.C.

(57) ABSTRACT

A system and method for delivering addressable or targeted advertising to subscribers during programming that the subscribers have recorded identifies the timing and characterization of programs to be recorded and the probable subscriber of those programs. Using the subscriber profiles of those subscribers, either already developed or generated on-the-fly based on program selection, and ad characterizations/profiles, the system generates a schedule of advertisements to be inserted into the avails (advertising opportunities) of the programming as it is recorded. The schedule generated can depend on correlations or matching between the ad profiles and the subscribers' profile, scheduling requirements (i.e., contracts and sales with advertisers) and timing. This system allows for targeted advertising to be delivered to subscribers during recorded programming and thus provides for additional opportunities for advertisers to reach subscribers in a highly addressable fashion.

15 Claims, 5 Drawing Sheets

Related U.S. Application Data continuation of application No. 11/196,774, filed on Aug. 3, 2005, now abandoned, which is a continuation of application No. 09/680,622, filed on Oct. 6, 2000, now abandoned.

(60) Provisional application No. 60/229,156, filed on Aug. 31, 2000, provisional application No. 60/196,375, filed on Apr. 12, 2000, provisional application No. 60/183,411, filed on Feb. 18, 2000, provisional application No. 60/183,409, filed on Feb. 18, 2000.

(51) Int. Cl.
| | | |
|---|---|---|
| *H04N 5/76* | (2006.01) | |
| *H04N 5/782* | (2006.01) | |
| *H04N 7/173* | (2011.01) | |
| *H04N 21/258* | (2011.01) | |
| *H04N 21/262* | (2011.01) | |
| *H04N 21/433* | (2011.01) | |
| *H04N 21/472* | (2011.01) | |
| *H04N 21/81* | (2011.01) | |
| *H04N 21/458* | (2011.01) | |

(52) U.S. Cl.
CPC ... *H04N 7/17318* (2013.01); *H04N 21/25891* (2013.01); *H04N 21/26208* (2013.01); *H04N 21/26258* (2013.01); *H04N 21/4334* (2013.01); *H04N 21/458* (2013.01); *H04N 21/47214* (2013.01); *H04N 21/812* (2013.01)

(58) Field of Classification Search
USPC .......................................... 725/9, 22, 32–36
See application file for complete search history.

(56) References Cited

U.S. PATENT DOCUMENTS

| | | |
|---|---|---|
| 5,600,364 A | 2/1997 | Hendricks et al. |
| 5,635,978 A | 6/1997 | Alten et al. |
| 5,652,574 A | 7/1997 | Wachob et al. |
| 5,758,259 A | 5/1998 | Lawler |
| 5,805,763 A | 9/1998 | Lawler |
| 5,940,073 A | 8/1999 | Klosterman et al. |
| 6,078,348 A | 6/2000 | Klosterman et al. |
| 6,088,722 A | 7/2000 | Herz et al. |
| 6,177,931 B1 | 1/2001 | Alexander et al. |
| 6,463,585 B1 * | 10/2002 | Hendricks ............ H04H 20/10 348/E5.002 |
| 6,698,020 B1 | 2/2004 | Zigmond et al. |
| 7,360,230 B1 | 4/2008 | Paz et al. |
| 2006/0212900 A1 * | 9/2006 | Ismail ................. H04H 60/06 725/34 |

* cited by examiner

FIG. 3   SET-TOP AD INSERTION

METHOD AND SYSTEM FOR ADDRESSABLE AND PROGRAM INDEPENDENT ADVERTISING DURING RECORDED PROGRAMS

CROSS REFERENCE TO RELATED APPLICATIONS

This application is a continuation of U.S. patent application Ser. No. 12/270,298, filed Nov. 13, 2008, entitled Method and System for Addressable and Program Independent Advertising During Recorded Programs, which is a continuation of U.S. patent application Ser. No. 11/196,774 filed on Aug. 3, 2005, now abandoned, entitled Method and System for Addressable and Program Independent Advertising during Recorded Program, which is a continuation of co-pending U.S. patent application Ser. No. 09/680,622 filed on Oct. 6, 2000, now abandoned, entitled Method and System for Addressable and Program Independent Advertising during Recorded Programs, which claims the benefit of U.S. Provisional Application Ser. No. 60/183,411 filed on Feb. 18, 2000, entitled Ad Management System; U.S. Provisional Application Ser. No. 60/183,409, filed on Feb. 18, 2000, entitled Ad Matching Service; U.S. Provisional Application Ser. No. 60/196,375 filed on Apr. 12, 2000, entitled Ad Matching Service; and U.S. Provisional Application Ser. No. 60/229,156 filed on Aug. 31, 2000, entitled Method and System for Addressable and Program Independent Advertising. The entire disclosures of all of these aforementioned priority applications are incorporated herein by reference.

This application is related to U.S. patent application Ser. No. 09/635,252 filed on Aug. 9, 2000, now abandoned, entitled Subscriber Characterization Based Electronic Program Guide Data; U.S. patent application Ser. No. 09/635,253 filed on Aug. 9, 2000, now U.S. Pat. No. 6,714,917, entitled Subscriber Identification Based on Electronic Program Guide Data; and U.S. patent application Ser. No. 09/635,542 filed on Aug. 10, 2000, now abandoned, entitled Grouping Subscribers Based On Demographic Data. The entire disclosures of all of these related applications are incorporated herein by reference.

FIELD OF THE INVENTION

The present invention relates generally to scheduling and delivery of targeted television advertisements (ad), and specifically to delivering the targeted ads during programming that a viewer (subscriber), or subscriber's agent, has chosen to record. The present invention also relates to delivering the targeted ads to a programmed recording device, wherein automatic programming of the programmed recording device is performed using an electronic program guide (EPG).

BACKGROUND OF THE INVENTION

Television (TV) advertising is a major component in assisting manufacturers, distributors, vendors, and other organizations interested in publicizing their product, brand, service, or viewpoint, in reaching segments of the public. Moreover, TV advertising subsidizes the cost of a large part of TV programming delivered to consumers. Advertisers commonly wish to deliver (target) certain ads to one or more groups of subscribers, such groups having particular demographic characteristics, such as income, age, gender, etc. These advertisers typically have access to market and demographic studies that allow them limited control over delivering their ads to specific groups of subscribers. One such method is "linked sponsorship", well known and used in the advertising industry. Linked sponsorship involves determining what demographic group or groups watch particular programming (e.g., from Nielsen data), and then buying (or contracting for) commercial spots during those programs for which the demographic viewership matches the desires of the advertiSerial Improvements over the linked sponsorship model have been developed which allow advertisers to target their ads to the appropriate viewers or groups of viewers more efficiently. Such systems are disclosed in applicants U.S. patent application Ser. No. 09/591,577 filed on Jun. 9, 2000, entitled "Privacy-Protected Advertising System"; Ser. No. 09/268,519 filed on Mar. 12, 1999, now U.S. Pat. No. 6,298,348, entitled "Consumer Profiling System"; Ser. No. 09/268,526 filed on Mar. 12, 1999, now U.S. Pat. No. 6,216,129, entitled "Advertising Selection System Supporting Discretionary Target Market Characteristics"; and Ser. No. 09/553,637 filed on Apr. 20, 2000, now U.S. Pat. No. 6,820,277, entitled "Advertising Management System for Digital Video Streams". All of these applications are hereby incorporated herein by reference. These systems provide, inter alia, for the collection and processing of consumer and subscriber data in order to develop a profile for a subscriber or group of subscribers. These profiles, along with ad characterizations and other advertiser requirements, are used to match and deliver "targeted" ads to subscribers such that subscribers receive ads more appropriate for them (i.e., of more interest and hence more effective). An additional important feature of these systems is that they provide for delivery and storage of ads at the set-top box (STB), and program independent insertion and presentation of these ads to the subscriber. These targeted advertising systems provide advertisers with the means to target and reach subscribers of interest to them more effectively.

Recording TV programming is quite common among TV viewers (subscribers). The recording of programming allows the subscriber more flexibility in what and when the subscriber watches programs of interest to that subscriber. This is particularly true in the cable TV arena where dozens to hundreds of programming choices are simultaneously available to the subscriber. Programming a Video Cassette Recorder (VCR) or other recording device can be a tedious process, for example, it may require navigating a complex programming menu, and the exact date and time of the desired programming must be obtained by the subscriber before any programming of the VCR can begin. Systems have been developed to simplify the recording process by reducing the number of keystrokes and providing a way for a subscriber to automatically program their VCR using program schedule information. Young et al. (U.S. Pat. No. 4,706,121) discloses a system for controlling VCR operation via broadcast scheduling information. Yuen et al. (U.S. Pat. Nos. 5,974,222, and 6,049,652) disclose a system allowing the subscriber to program their VCR to record a program that is selected from the EPG. Jackson (U.S. Pat. No. 5,963,264) also discloses a method for automatically programming a recording device via an EPG. All of the aforementioned patents are hereby incorporated by reference. These and other systems provide for "one-touch record", wherein the subscriber identifies a program (i.e., via the EPG) that the subscriber wishes to record. The subscriber, while highlighting the desired program, presses a special record button on the remote control, which then programs a pre-configured recording device to record that program (i.e., that channel and that time according to the EPG). Another feature of the interactive EPG, disclosed in those patents is that of a subscriber being able to select or "flag" a future program for watching. When the program selected begins, the EPG notifies the subscriber, or alternatively tunes directly to the selected program.

In the advertising systems mentioned above, delivery to the subscriber of targeted or program independent advertising is accomplished while the subscriber is viewing a particular program. Targeted ads can be delivered with particular programming or they can be inserted at the STB and presented to the subscriber independent of the programming being viewed. However, many times a subscriber wants to record a program, for example, when the subscriber wishes to 'watch' two shows that are broadcast concurrently. Systems that allow for recording a program while concurrently watching a different program are well known in the art. In another example, the subscriber merely wishes to watch a particular program at a different time than when that program is actually broadcast. The subscriber may program their preferred recording device (i.e., via the EPG) to record such programming. In some systems, targeted ad delivery is dependent on detecting viewership (i.e. detecting whether or not the TV is on, or whether or not there are regular commands from the remote control). However, when a program is recorded, the TV is not typically on, and the subscriber is not present. Thus, targeted ad delivery is not performed. The ability to deliver targeted advertising to subscribers, independent of when they watch a program is desirable, and thus delivering ads during recorded programming is desirable.

For the foregoing reasons, there is a need for a method and system by which targeted and/or program independent advertisements can be scheduled, delivered and presented to the subscriber while the subscriber is watching recorded programming. There is also a need to be able to deliver targeted advertising to subscribers during programming that they have selected or "flagged" for future watching. There is a further need for identifying the increased number of targeted advertising opportunities (avails) available in recorded or flagged programming, and delivering targeted ads to the subscriber in these avails so that the subscriber will receive addressable advertising when viewing the recorded or flagged program. There is a further need for inserting targeted advertising into programming scheduled to be recorded through the EPG, and for being able to utilize the EPG data to characterize programming and viewership such that optimum ad-viewer (subscriber) matching can be achieved.

SUMMARY OF THE INVENTION

The present invention comprises a method and system for delivering addressable, or targeted, advertising to subscribers during programming that the subscribers have recorded. In one embodiment of the present invention, targeted ads are delivered during programming that has been "flagged" for future viewing. Specifically, the present invention provides the means to deliver highly targeted, and in some cases, individualized ads, to subscribers that have programmed a recording device to record one or more programs. This targeted advertising system identifies the timing and characterization of programs to be recorded, and the probable subscriber or subscribers of those programs. Using subscriber profiles, either already developed or generated on-the-fly based on program selection and ad characterizations/profiles, the system generates a schedule of ads to be inserted into the avails (advertising opportunities) of the programming as it is recorded (or as it is displayed), and inserting the ads according to the schedule. The schedule generated can depend on, inter alia, correlations or matching between the ad profiles, the subscribers' profiles, scheduling requirements (i.e., contracts and sales with advertisers), and timing. In one embodiment, the schedule, along with the ads, are delivered to the set-top box (STB) for insertion during the recorded programming. In another embodiment, the ads are periodically delivered and stored on the STB and the STB generates the schedule based on a scheduling algorithm. Ads are inserted into the avails according to the schedule and a record of such insertion is generated to be used for billing. This system allows for targeted advertising to be delivered to subscribers during recorded programming and thus provides for additional opportunities for advertisers to reach subscribers in a highly addressable fashion.

According to one embodiment of the present invention, a subscriber uses an electronic program guide (EPG)-record feature to program their recording device to record a specific program or a specific time block. The programming to be recorded is selected via the EPG, and a special record button is pressed or menu option chosen to record the selected program. The recording device is then programmed according to the EPG schedule or alternatively is activated by the EPG at the appropriate recording time.

In another embodiment, the EPG is used to flag or select a program for future viewing. Targeted advertising can be scheduled and delivered in advance of the programming and displayed during the selected programming.

Another object of the present invention is to provide additional targeted advertising opportunities by allowing for targeted ad delivery and presentation to be accomplished during a recorded program, in addition to the targeted advertising performed during "real-time" viewing by the subscriber. Moreover, in cases where a subscriber wishes to record one or more programs while simultaneously viewing another program, the present invention allows for targeted advertising to be delivered with both the program being viewed and with the recorded program. This method works for systems that can record one or more programs concurrently with the viewing of another program.

It is a further object of the present invention to allow for grouping of subscribers and the delivery of targeted advertisements to groups of subscribers in which members of the groups have programmed their recording device to record one or more of the same programs or have flagged one or more of the same programs for future viewing.

It is yet another object of the present invention to allow for the insertion of targeted advertising during the recording of programming or alternatively, when the programming is being viewed (i.e., displayed on a monitor).

Another object of the present invention is to allow for the customized creation of avails (advertising opportunities) in the recorded programming.

These and other features and objects of the present invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

DETAILED DESCRIPTION OF THE INVENTION

Figure 1:
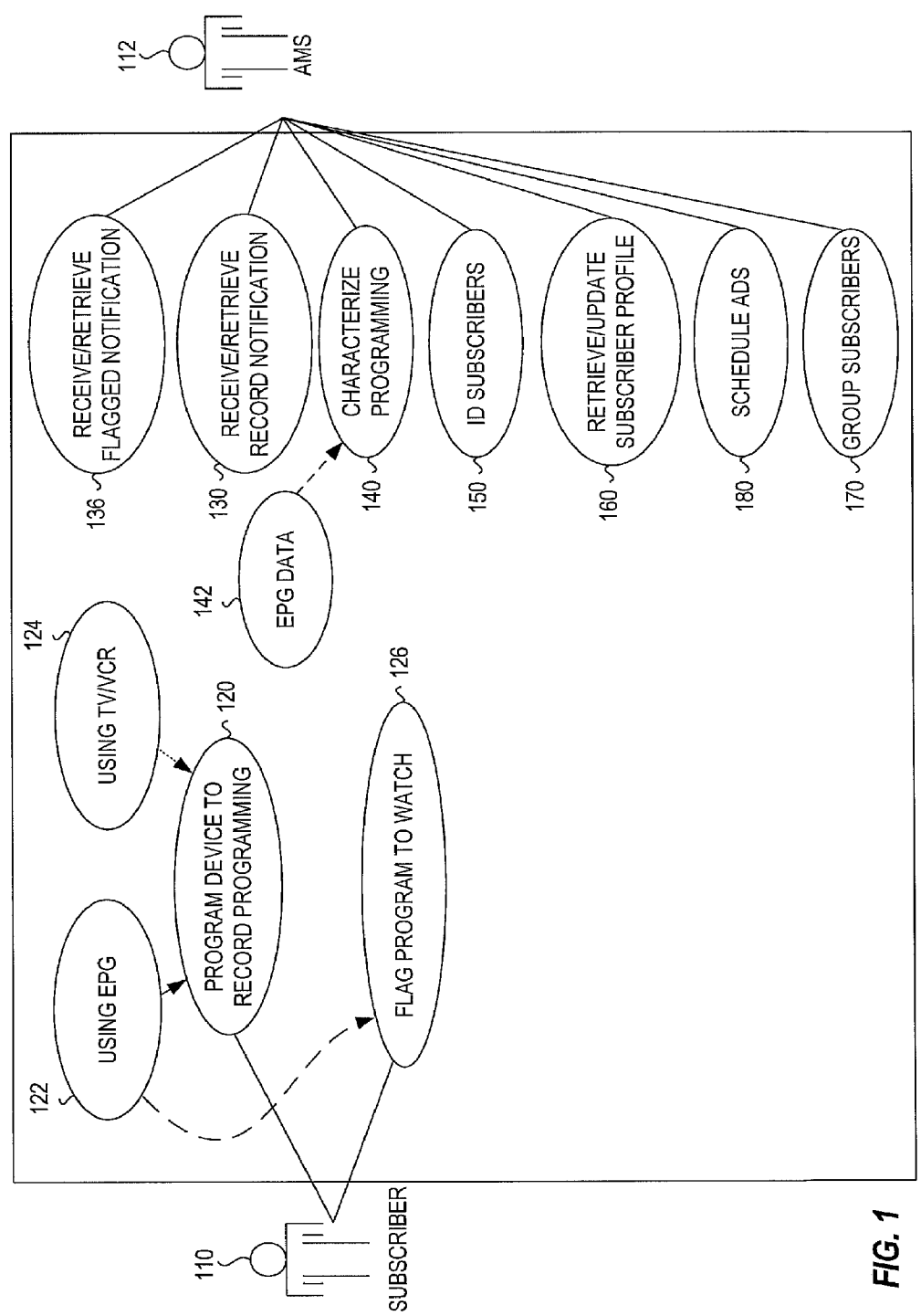
FIG. 1 is a context diagram illustrating use cases and responsibilities of various elements of the system, according to one embodiment.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 5 in particular, the method and system of the present invention is disclosed.

FIG. 1 illustrates a use case diagram of an exemplary embodiment of the current invention. A subscriber 110 programs (by himself or through an automated agent) a recording device, such as a Video Cassette Recorder (VCR) or a Set-Top Box Hard Drive (STB HD), to record one or more programs that the subscriber 110 desires to watch or interact with in some way (120). As discussed above, many methods for programming a recording device to record one or more upcoming programs is well known to those of ordinary skill in the art. In a preferred embodiment, the subscriber 110 utilizes an electronic program guide (EPG) to identify one or more programs that the subscriber 110 wishes to record (122). As one skilled in the art knows, the subscriber 110 can select (i.e., highlight) one or more programs listed or advertised in the EPG for recording. By selecting a program in the EPG, and then "clicking" a special button on the remote, the program selected will be automatically recorded by the subscriber's preferred recording device. There are other methods of programming a recording device to record programming, including but not limited to conventional on-screen VCR programming (124) or simply pressing the record button on the recording device to start recording.

It is to be understood that although the description of the invention is given with reference to a preferred embodiment of utilizing the "EPG-record" feature, any and all other methods of recording programming are equally adapted to and embraced by the present invention, as will be evident to those of ordinary skill in the art. Furthermore, the selected programs could be currently running (in which case, the recording would begin immediately), or the programs selected could be in the near or distant future depending on how far in advance the EPG data extended. Also, the subscriber 110 would be able to watch one show while simultaneously recording others.

An Advertisement Management System (AMS) 112 receives notification of an upcoming record session (130). A preferred embodiment of the AMS 112 is described in applicants U.S. Provisional application No. 60/183,411 filed on Feb. 18, 2000 entitled "Ad Management System". The AMS 170 may be located at a recording device or a STB. In a preferred embodiment, the AMS 112 is located remote from the STB, such as at a Cable TV Head End (HE).

In another embodiment, the subscriber 110 may select or "flag" a future program for watching (126). As discussed above, when the program selected begins, the EPG notifies the subscriber 110 or alternatively tunes directly to the selected program. The AMS 112 is notified of an upcoming flagged event (136).

The selections of programs to record or programs that have been flagged may be sent directly from the EPG or VCR (depending on the method used to program the recording) to the AMS 112. The record and/or flag features could be configured to automatically send notification to the AMS 112 or alternatively, the AMS 112 could periodically poll the recording device or EPG record and/or flag databases to gain access to the programmed record and/or flag schedules.

After receiving notification of a future record (130) or flagged (136) event, the AMS 112 characterizes the particular program (140). The AMS 112 characterizes the program by gathering data including, but not limited to, timing, duration and programming (i.e., title and category of program, description of program, etc.). Such programming information could be extracted from a variety of sources, but in a preferred embodiment, the programming information is retrieved from the EPG database (142), as described in applicants co-pending U.S. patent application Ser. No. 09/635,252 filed on Aug. 9, 2000 entitled "Subscriber Characterization Based on Electronic Program Guide Data".

The AMS 112 also identifies probable subscribers (150) who would be watching the program that has been identified as being recorded or flagged. This identification may be based on the characterization of the program (140). In a preferred embodiment, the potential or probable subscribers are identified by a subscriber ID. Such identification is used to obtain a subscriber profile that is used to allow for the most efficient matching and targeting of ads to be scheduled and delivered during the recorded programming. The identification could be that of a "household," (i.e., the profile or aggregate profile of the entire household), a particular STB within that household (i.e., different subscribers within the household frequent one STB preferentially to others), or of a particular unique subscriber. Subscriber identification becomes increasingly important when it is recognized that a unique household may comprise multiple distinct subscribers and each subscriber may have a unique profile. For instance, each of several STBs within a household may be associated with a different subscriber and thus have a different profile. Thus, the STB used to record (or receive) the program to be recorded would be identified with a profile corresponding to a particular subscriber 110. Alternatively, a single STB could be used for multiple subscribers 110 and would be assigned a particular profile based on the different times and/or for different events that are flagged or programmed to be recorded.

In a preferred embodiment, the subscriber's profile could be one of several unique profiles corresponding to unique individuals within the household. Methods of subscriber identification are known in the art (i.e., entering a personal identification number (PIN) or using an individual remote). A novel method of identifying one subscriber from several subscribers that use the same remote and STB is described in applicants co-pending U.S. patent application Ser. No. 09/635,253 filed on Aug. 9, 2000 entitled "Subscriber Identification Based on Electronic Program Guide Data", which is hereby incorporated by reference. This application describes how subscriber interaction with the remote, including volume changes, rapidity of channel changes, methods and characteristics of interacting with the EPG, etc., are used to develop a subscriber "identity profile", such a profile being used to distinguish one subscriber 110 from a multitude of subscribers 110 using the same remote/STB.

Once the potential and probable subscriber is identified, the profile of the subscriber is retrieved (160) such that optimal ad matching and targeting can be accomplished. Moreover, the profile retrieved can be updated based on the latest interaction with the EPG (i.e., the programming selected to record can be used to contribute to the profile of the subscriber). Methods of developing subscriber profiles based upon click-stream data and demographic databases are described in detail in applicants' co-pending U.S. patent application Ser. No. 09/635,542 filed on Aug. 10, 2000 entitled "Grouping Subscribers Based on Demographic Data". Although the profile used to match and target ads in the recorded programming would be, in a preferred embodiment, the profile of the individual (or individual's agent) that programmed the recording device, it is also possible for the programmer to select a profile to use (i.e., other than their own). This would be useful in the case that one individual recorded a program for another individual. Algorithmic means could also be employed to statically predict the probable subscriber of the recorded programming (i.e., based on its context and timing). Using one or more of the above-described means, the subscriber profile is obtained by the AMS 112.

Having obtained the specifics of what will be recorded and who (i.e., what profiles) will be watching the recorded programming, the AMS 112 can either group the subscribers (170) and build a schedule of ads to be delivered with and/or inserted into the recorded programming (180). The targeted ads are inserted into the program based on the schedule (190). In the preferred embodiment, the targeted ad insertion occurs at the STB as the programming is being recorded (192). In one alternative embodiment, the ad insertion occurs at the HE. The applicable presentation stream (program stream with targeted ad) is delivered to the subscriber 110 (194). In an alternate embodiment, the insertion occurs during playback. Mechanisms for ad characterization, matching, scheduling, and sales are described in applicants co-pending U.S. patent application Ser. No. 09/591,577 filed on Jun. 9, 2000 entitled "Privacy-Protected Advertising System" and Ser. No. 09/268,526 filed on Mar. 12, 1999 entitled "Advertising Selection System Supporting Discretionary Target Market Characteristics", which are herein incorporated by reference.

Figure 2:
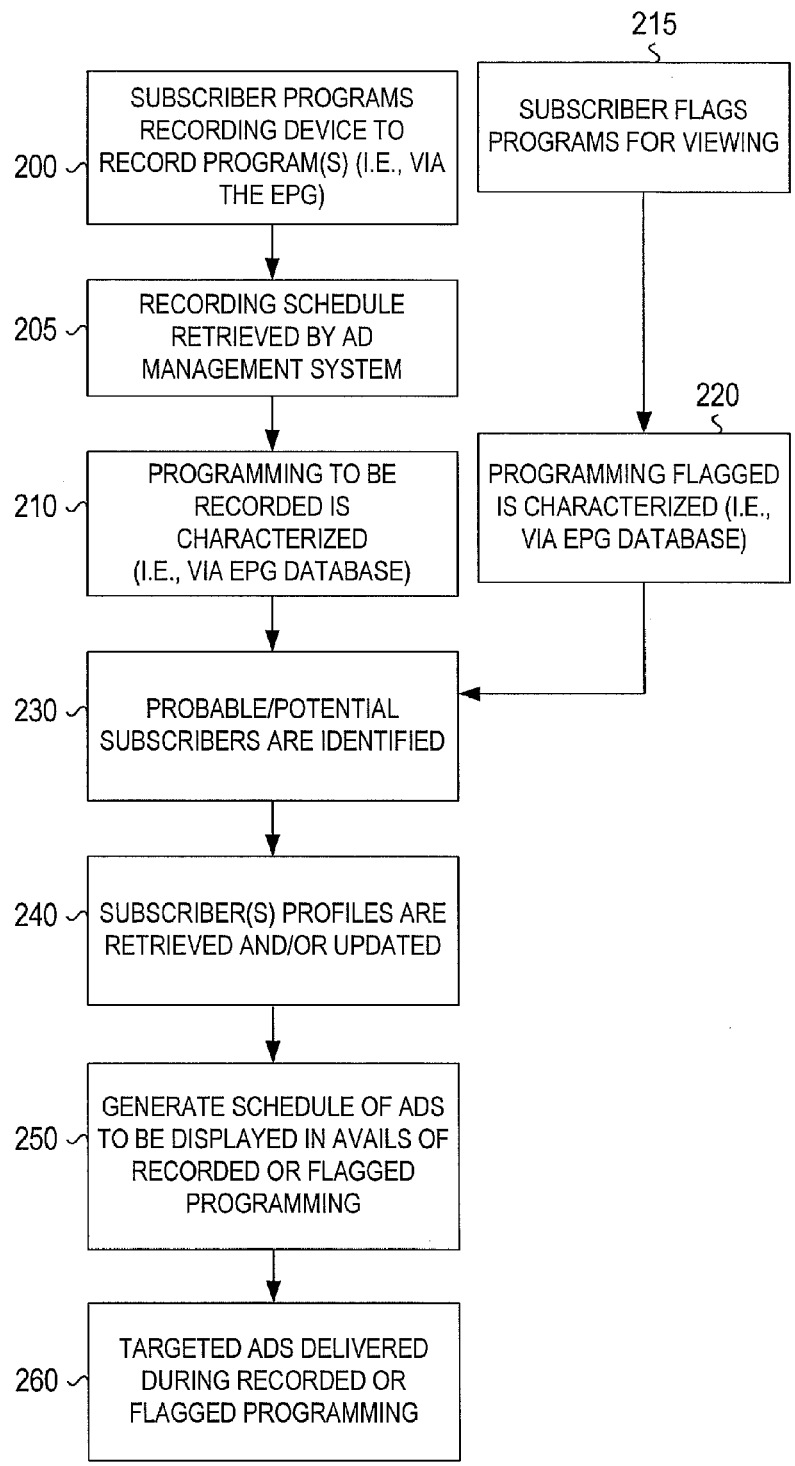
FIG. 2 is a process flow diagram, illustrating one mechanism of achieving targeted advertising, according to one embodiment.

FIG. 2 illustrates an exemplary method for targeting ads in programs to be recorded or programs that are flagged. A subscriber 110 programs a recording devise to record a particular TV program (step 200). In a preferred embodiment, the subscriber 110 programs TV programs to record with an EPG. The recording schedule is either retrieved from the EPG by the AMS 112 or the EPG sends the recording schedule to the AMS 112 (step 205). The AMS 112 characterizes the programs to be recorded (step 210). The subscriber 110 may also flag a TV program to be viewed at a later time (step 215). The AMS 112 characterizes the flagged programs (step 210). Regardless of whether the TV program is programmed to be recorded or is flagged for viewing at a particular time, the AMS 112 identifies probable or potential subscribers 110 (step 230). The AMS 112 then retrieves and updates profiles for these subscribers 110 (step 240). Based on the identified programs and the identified subscriber profiles the AMS 112 generates a schedule of avails and matches ads with these avails (step 250). The targeted ads are then delivered during the program (step 260).

Figure 3:
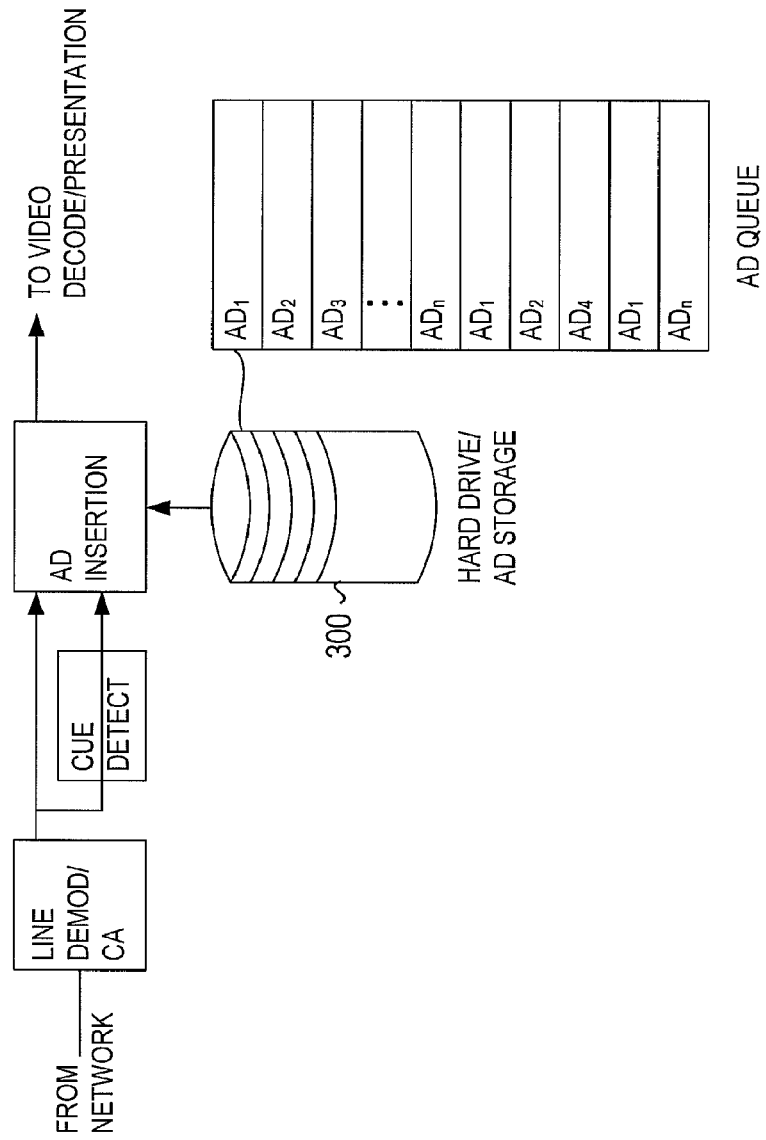
FIG. 3 illustrates ad insertion at the STB, according to one embodiment.

FIG. 3 illustrates ad insertion at a STB 300, according to one embodiment of the present invention. Ads are stored locally in the STB 300 and are inserted into programming avails according to a schedule generated by the AMS 112. In a preferred embodiment, the AMS 112 would build such a schedule based on ad scheduling sales and contracts, ad profile and subscriber profile matching, and advertiser requirements/desires and constraints. Such functions of the AMS 112 including ad-subscriber matching, ad scheduling, ad delivery, and ad insertion, are described in detail in applicants U.S. provisional application No. 60/183,409 filed on Feb. 18, 2000 entitled "Ad Matching Service", 60/196,375 filed on Apr. 12, 2000 entitled "Ad Matching Service", and 60/229,156 filed on Aug. 31, 2000 entitled "Method and System for Addressable and Program Independent Advertising", all of which are incorporated herein by reference. Moreover, in cases of non-live (i.e. prerecorded) broadcast, the avail schedule may be known more definitively in advance, which may allow more efficient scheduling.

In a preferred embodiment, ad insertion is performed at the STB 300 with ads being delivered and stored at the STB 300 for subsequent insertion according to a schedule. Alternatively, ad identifiers are sent or stored at the STB 300. When an ad is to be inserted in the programming, the appropriate ad identifier is used to request the ad (i.e., from a streaming media server). The scheduler would form a schedule of ads to be inserted into the recorded programming. This schedule could take on many forms, but in a preferred embodiment, it is in the form of an ad queue as described in applicants U.S. Patent Application Ser. No. 60/229,156 filed on Aug. 31, 2000 entitled "Method and System for Addressable and Program Independent Advertising". As described in that application, such an ad queue can be used to accomplish, inter alia, targeted and program independent advertising.

One aspect and advantage of the invention that needs to be emphasized is the creation of additional opportunities for the delivery of targeted advertising. Additional avails maybe created by the system itself (i.e., advertising during a premium or PPV event). However, because a subscriber 110 may record one or more programs while concurrently watching one or more other programs, it is readily apparent that more "avails" exist for the delivery of targeted ads. For instance, while a subscriber 110 is watching one prime time program, another one is being recorded. The number of prime-time avails in this example has doubled.

Figure 4:
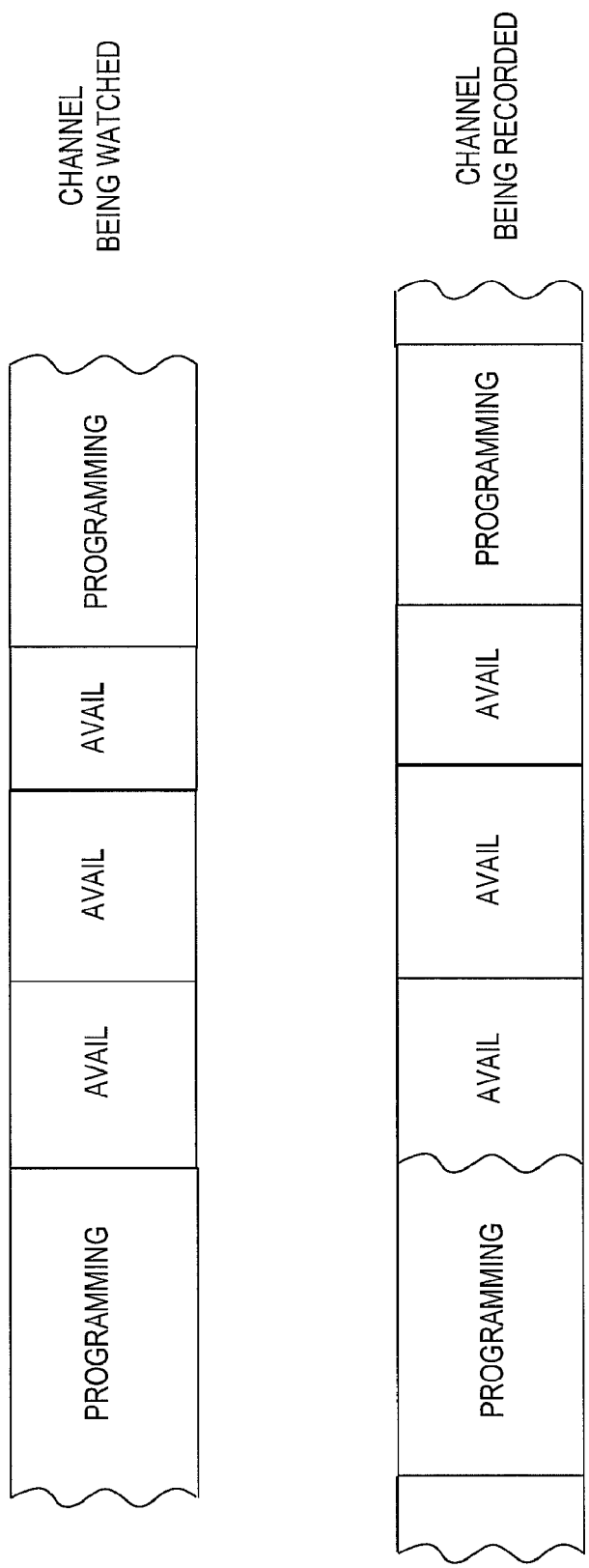
FIG. 4 illustrates the increase in the number of avails for targeted advertising when targeted advertising is directed to recorded programming, according to one embodiment.

FIG. 4 illustrates how one subscriber 110 is watching one program while recording another program, the number of avails for targeted advertising is effectively doubled from a case in which the subscriber 110 only watches one program. This could happen when there is only one receiver in the home and two or more different subscribers 110 want to watch different programs that are aired at the same time. It could also be the case that one subscriber 110 wants to watch two programs that are broadcast concurrently. Other circumstances that illustrate the opportunity to take advantage of the number of increased avails presented because of the recording of programming include using, to receive and record programming, multiple STBs, a STB with multiple tuners, and Residential Gateways (RGs) that can distribute multiple channels simultaneously to various household devices (i.e., TVs and VCRs).

In an alternative embodiment, the ad matching and ad scheduling is done at the STB 300 (as opposed to the HE). Based on the programming, the subscriber profile, and the advertisements contracts or sales (i.e., ad priorities), one or more algorithms resident and executing on the STB 300 receive the record schedule and generate a queue of ads that the STB 300 will insert and display during the avails of the recorded programming. It is to be understood that ad matching and scheduling can be done to varying degrees at either the STB 300 or the HE depending on the desired implementation, but where the matching and scheduling is performed does not affect the inventive concept of targeted advertising during recorded programming.

The following is an example scenario of how the method and system of the present invention would be used to effect targeted advertising during a recorded program. A subscriber 110, using an EPG, identifies a program that the subscriber 110 wishes to record, and uses the EPG-record (i.e., VCR+ function) button on the remote control to select that program for recording.

In a preferred embodiment, the potential subscribers 110 of the recorded programming are identified and their profiles are accessed and used, along with other inputs, to determine which ads will be presented in the recorded program. There could be an additional feature of the EPG-record, allowing for the identity(ies) and thus the profile(s) of the actual subscribers 110 to be determined. The advertising targeted to the view would be determined based on the appropriate profile, or alternatively as described above, a subscriber identification function would be performed to associate the recording session with one or more specific profiles. The schedule generated is used to deliver targeted ads in the programming to be recorded.

The present invention also allows for the customized creation of avails (advertising opportunities) in the recorded programming. In a preferred embodiment, ads are inserted into programming at the STB 300, the ads having been delivered to and stored at the STB 300 or requested in real-time from another source at the time of insertion, customized creation or modification of avails is possible. For instance, when a subscriber 300 records a conventional "commercial free" program such as a PPV program or premium channel (i.e., HBO), avails can be created before and after the recorded program (or even during a customized Intermission). For example, the recording device could begin recording a few minutes before the start of the recorded programming, and customized ads could be inserted into this space. Ads could also be inserted into the end of programming by causing the recording device to record for a few additional minutes. Typically, movies are scheduled in a time frame (i.e. 2 hrs) but do not run for this long. Targeted advertising could be inserted into the space between the end of the movie and the end of the recording period.

According to one embodiment of the present invention, the grouping of subscribers 110 and the delivery of targeted ads to groups of subscribers 110 in which members of the groups have programmed their recording device to record the same programming are accomplished. Popular programs, debuts, sports and political events, and all other programming which expect a large audience, will typically be recorded by subscribers 110 who can not watch the program during the broadcast (i.e., they're watching or doing something else). In these circumstances, a large number of subscribers 110 may program their recording device to record the same program. These programmed instructions can be retrieved by the AMS 112, and targeted advertising can be delivered to groups and sub-groups within this recording population. This targeted advertising can be accomplished by ad insertion at the HE as described in applicants co-pending U.S. patent application Ser. No. 09/635,542 filed on Aug. 10, 2000 entitled "Grouping Subscribers Based on Demographic Data", which is hereby incorporated by reference.

Figure 5:
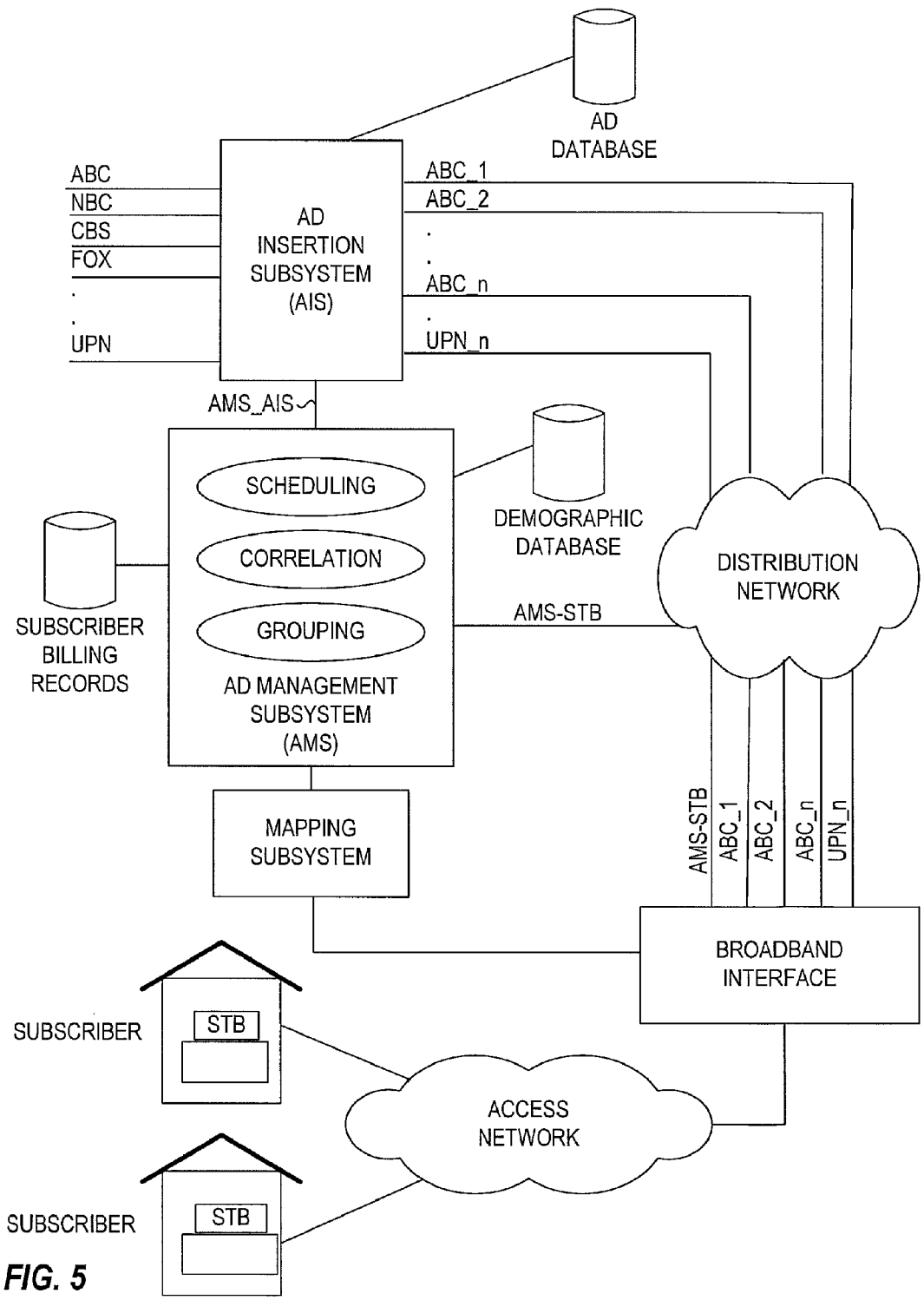
FIG. 5 illustrates an example architecture for the delivery of multiple presentation streams with targeted advertisements, according to one embodiment.

FIG. 5 illustrates an example architecture for the delivery of multiple presentation streams with targeted ads. The above application describes a method for grouping subscribers, and matching ads to those subscriber groups. At the HE, multiple presentation streams are created corresponding to the subscriber groups and targeted ads are inserted and delivered with these streams to the appropriate group(s). The subscribers belonging to a common group will receive and record programming containing targeted ads. In this system, ad insertion occurs at the HE, not at the STB 300. The programmed record schedule (i.e., via the EPG) would be transmitted to the HE, groups of subscribers 110 identified or formed, and targeted ads inserted and delivered to target groups during that programming for which subscribers 110 had programmed their recording device to record (i.e., via the EPG).

In an alternate embodiment, the EPG is used to flag or select a program for future viewing. Such an EPG "notify to watch" feature is well known in the art as mentioned above. Targeted advertising can be scheduled and delivered in advance of the programming and displayed during the selected programming. The AMS 112 would detect that a subscriber 110 had flagged a program for future viewing. A new or revised ad schedule or queue could be generated in anticipation of the flagged programming, taking into account, inter alia, the program characteristics, and its derivative effects (i.e., identify and update profile of subscriber) thus improving the efficiency of the targeting of advertisements.

Although this invention has been illustrated by reference to specific embodiments, it will be apparent to those of ordinary skill in the art that various changes and modifications may be made that clearly fall within the scope of the invention. The invention is intended to be protected broadly within the spirit and scope of the appended claims.

What is claimed is:

1. A method of a subscriber video recording device inserting at least one targeted advertisement into a video program, the method comprising:
   receiving, at the subscriber video recording device, at least one targeted advertisement and storing the at least one targeted advertisement;
   receiving, at the subscriber video recording device, at least one video program;
   recording, at the subscriber video recording device, the at least one video program;
   identifying, at the subscriber video recording device, at least one existing advertising avail within the recorded video program, the at least one advertising avail having a first duration;
   modifying, at the subscriber video recording device, the at least one advertising avail to create a customized avail within the recorded video program, the customized avail having a duration not equal to the first duration; and
   retrieving the stored at least one targeted advertisement and inserting the at least one targeted advertisement into the customized avail.

2. The method of claim 1, further comprising:
   selecting at least one of the advertisements to insert into the customized avail based at least in part on a characterization of the at least one video program.

3. The method of claim 2, wherein the characterization of the at least one video program is based on at least one of the timing information of the video program, the duration of the video program, the content of the video program, the title of the video program and the program description.

4. The method of claim 1, further comprising:
creating a user profile for the user of video recording device; and
updating the user profile in response to the recording.

5. The method of claim 4, wherein at least one advertisement is selected to be received by the video recording device and inserted into the customized avail based at least in part on the profile.

6. The method of claim 1, wherein at least one video program includes pay-per-view content.

7. The method of claim 1, wherein at least one video program is received via the Internet.

8. The method of claim 1, wherein at least one video program is received via a cable television network.

9. The method of claim 1, further comprising:
generating a record of the inserting at least one advertisement to be used for billing.

10. A subscriber video recording system for inserting at least one targeted advertisement into a video program, the system comprising:
a video receiving module for receiving at least one video program and for receiving at least one targeted video advertisement;
a storage device for recording the received video program and storing the at least one targeted video advertisement; and
a processing module for identifying at least one existing advertising avail within the recorded video program, the at least one advertising avail having a first duration, and modifying the at least one advertising avail to create a customized avail within the recorded video program, the customized avail having a duration not equal to the first duration, and for retrieving the stored at least one targeted advertisement and inserting the at least one video advertisement into the customized avail.

11. The system of claim 10, further comprising:
a video selection module for selecting advertisements for insertion into the customized avail, wherein the selection is based at least in part on a characterization of the at least one video program.

12. The system of claim 11, wherein the characterization of the at least one video program is based on at least one of the timing information of the video program, the duration of the video program, the content of the video program, the title of the video program and the program description.

13. The system of claim 10, wherein the video selection module utilizes a profile of a user of the system to select advertisements for insertion into the avail.

14. The system of claim 10, wherein the video receiving module receives videos via the Internet.

15. The system of claim 10, wherein the video receiving module receives videos via a cable television network.

* * * * *